(12) United States Patent
Geffen et al.

(10) Patent No.: US 12,166,684 B2
(45) Date of Patent: *Dec. 10, 2024

(54) TRACKING FLOWS HAVING ENCRYPTED SEQUENCE AND ACKNOWLEDGMENT NUMBERS

(71) Applicant: Vasona Networks, Inc., Austin, TX (US)

(72) Inventors: Itai Geffen, Tel Aviv (IL); Roni Bar Yanai, Even Yehuda (IL)

(73) Assignee: Vasona Networks, Inc., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/171,599

(22) Filed: Feb. 20, 2023

(65) Prior Publication Data

US 2023/0208777 A1 Jun. 29, 2023

Related U.S. Application Data

(63) Continuation of application No. 17/163,660, filed on Feb. 1, 2021, now Pat. No. 11,595,317, which is a continuation of application No. 16/423,751, filed on May 28, 2019, now Pat. No. 10,938,731, which is a continuation of application No. 15/803,779, filed on Nov. 5, 2017, now Pat. No. 10,305,812.

(51) Int. Cl.
*H04L 47/34* (2022.01)
*H04L 9/40* (2022.01)
*H04L 69/164* (2022.01)

(52) U.S. Cl.
CPC .......... *H04L 47/34* (2013.01); *H04L 63/0428* (2013.01); *H04L 69/164* (2013.01)

(58) Field of Classification Search
None
See application file for complete search history.

(56) References Cited

PUBLICATIONS

Notice of Allowance mailed on Oct. 26, 2022, filed in U.S. Appl. No. 17/163,660, p. 1.
Terminal Disclaimer approved on Sep. 28, 2022, filed in U.S. Appl. No. 17/163,660, p. 1.
Terminal Disclaimer filed on Sep. 28, 2022, filed in U.S. Appl. No. 17/163,660, pp. 1-3.
Response to Final Office Action dated Sep. 28, 2022, filed U.S. Appl. No. 17/163,660, p. 1-7.
Final Office Action dated Apr. 28, 2022, filed in U.S. Appl. No. 17/163,660, p. 1-6.

*Primary Examiner* — Robert M Morlan

(57) ABSTRACT

A processor is configured to receive, from a first device, a plurality of first-direction packets belonging to a flow of communication, pass the first-direction packets to a second device, receive, from the second device, a plurality of second-direction packets belonging to the flow, pass the second-direction packets to the first device, calculate, after receiving each of at least some of the second-direction packets, an estimated in-flight number, by assuming that the second-direction packet acknowledges receipt of a number of the first-direction packets that is based on an estimated average number of received first-direction packets acknowledged by the second-direction packets, the estimated in-flight number being an estimated volume of payload data, contained at least partly in the first-direction packets, that has been passed by the processor to the second device but has not yet been received by the second device, and to regulate the flow, based on the estimated in-flight number.

11 Claims, 3 Drawing Sheets

| TIME INTERVAL | CURRENT BUCKET POINTER POINTS TO | RECEIVED PACKET | PACKETS PASSED TO CLIENT | SIM_SEQ | SIM_ACK | OPERATION ON CACHE | ACK POINTER POINTS TO | UE CONDITION B1 B2 B3 B4 B5 B6 B7 B8 B9 B10 | IF_EST |
|---|---|---|---|---|---|---|---|---|---|
| T10 | B8 | | | 0 | 0 | | B8 | | 0 |
| T11 | B1 P1 | UDP-BASED SIZE N1 | P1 | 1 | 0 | WRITE 1→B1 | B8 | [1] N1 | N1 |
| T12 | B2 P2 | TCP SEQ S1 SIZE N2 | P2 | 1 | 0 | WRITE S1→B2 | B8 | [1] [1] N1 N2 | N1+N2 |
| T13 | B3 P3 | UDP-BASED SIZE N3 | P3 | 2 | 0 | WRITE 2→B3 | B8 | [1] [1] [2] N1 N2 N3 | N1+N2 +N3 |
| T14 | B4 P4 | UDP-BASED SIZE N4 | | 2 | 2 | READ 2→B3 | B3 | [1] [1] [2] [2] N1 N2 N3 0 | 0 |
| T15 | B5 P5 | TCP ACK S1 | | 2 | 1 | READ S1→B2 | B2 | [1] [1] [2] [2] [2] N1 N2 N3 0 0 | N3 |
| T16 | B6 P6 | UDP-BASED SIZE N6 | | 2 | 1 | | B2 | [1] [1] [2] [2] [2] [2] N1 N2 N3 0 0 0 | N3 |

CONTINUE IN FIG. 2B

TRACKING FLOWS HAVING ENCRYPTED SEQUENCE AND ACKNOWLEDGMENT NUMBERS

FIELD OF THE INVENTION

The present invention relates to the field of digital communication, e.g., over cellular networks.

BACKGROUND

The Quick User Datagram Protocol (UDP) Internet Connections protocol, known as QUIC, is a transport layer network protocol that supports connections over UDP. QUIC may be used, e.g., over a cellular network, for various applications, such as for the streaming of content from a server to a client, or for peer-to-peer communication between devices. For a communication session that includes a bidirectional flow of data, such as a peer-to-peer communication session, two QUIC flows are used: one flow for data passed in one direction, and another flow for data passed in the other direction. A QUIC flow may include one or more parallel streams of communication.

Each QUIC packet belonging to a given flow includes, in its encrypted payload, a sequence ("seq") number and an acknowledgement ("ack") number. Generally, any QUIC packet that carries data in its payload, referred to herein as a "data packet," will have its seq number set by the device that sends the packet. Typically, the seq number is incremented for each data packet, such that the seq number corresponds to the serial number of the packet. Thus, for example, assuming that the first data packet communicated from the device has a seq number of 1, the third data packet communicated from the device would have a seq number of 3. The receiving device acknowledges the receipt of any data packets by communicating "acknowledgement packets" to the sender, setting the ack number in each of these packets to the seq number of the data packet that was most recently received. For example, after receiving a data packet having a seq number of 100, the receiving device may send the sender of this data packet an acknowledgement packet having an ack number of 100, indicating that all of the data packets having a seq number equal to or less than 100 were received by the device.

QUIC is described by Iyengar and Swett in "QUIC: A UDP-Based Secure and Reliable Transport for HTTP/2," published as an Internet Draft by the Internet Engineering Task Force (IETF), 2015, which is incorporated herein by reference. QUIC is used by many common applications, such as Google Chrome, YouTube, and Snapchat.

SUMMARY OF THE INVENTION

There is provided, in accordance with some embodiments of the present invention, a system for regulating a flow of communication between a first device and a second device. The system includes a network interface and a processor. The processor is configured to receive from the first device, via the network interface, a plurality of first-direction packets belonging to the flow, and to pass the first-direction packets to the second device. The processor is further configured to receive from the second device, via the network interface, a plurality of second-direction packets belonging to the flow, and to pass the second-direction packets to the first device. The processor is further configured to calculate, after receiving each second-direction packet of at least some of the second-direction packets, an estimated in-flight number, by assuming that the second-direction packet acknowledges receipt of a number of the first-direction packets that is based on an estimated average number of received first-direction packets acknowledged by the second-direction packets, the estimated in-flight number being an estimated volume of payload data, contained at least partly in the first-direction packets, that has been passed by the processor to the second device but has not yet been received by the second device. The processor is further configured to regulate the flow, based on the estimated in-flight number.

In some embodiments, each second-direction packet of the second-direction packets includes an encrypted acknowledgement number that indicates a number of the first-direction packets that were received by the second device at a time at which the second-direction packet was communicated by the second device, and the processor is configured to calculate the estimated in-flight number without decrypting the acknowledgement number in any of the second-direction packets.

In some embodiments, the processor is configured to regulate the flow by controlling a rate at which the first-direction packets are passed to the second device.

In some embodiments, the flow uses a Quick User Datagram Protocol Internet Connections (QUIC) communication protocol.

In some embodiments, the processor is further configured:
to identify a total number of other first-direction packets, and a total number of other second-direction packets at least some of which acknowledge receipt of the other first-direction packets, belonging to one or more other flows, prior to receiving the first-direction packets, and
to calculate the estimated average number of received first-direction packets acknowledged by the second-direction packets, by calculating a ratio between the total number of other first-direction packets and the total number of other second-direction packets.

In some embodiments, the processor is further configured to update, repeatedly, as the flow progresses, the estimated average number of received first-direction packets acknowledged by the second-direction packets, based on a ratio between (i) a number of the first-direction packets that have been received by the processor and passed to the second device, and (ii) a number of the second-direction packets that have been received by the processor.

In some embodiments, the flow is a first flow, the first-direction packets are first-flow first-direction packets, and the processor is further configured:
to receive, and to pass to the second device during a particular interval of time, a second-flow first-direction packet belonging to a second flow of communication,
to receive from the second device, subsequently to the particular interval of time, a second-flow second-direction packet, belonging to the second flow, that indicates that the second-flow first-direction packet was received by the second device, and
to calculate the estimated in-flight number, in response to receiving the second-flow second-direction packet, based on a volume of payload data contained in those of the first-flow first-direction packets that were passed to the second device by the processor subsequently to the particular interval of time.

In some embodiments,
the processor is configured to receive a later one of the first-direction packets after receiving one or more earlier ones of the first-direction packets, the processor is configured to pass the later one of the first-direction packets to the second device before passing the earlier ones of the first-direction packets to the second device, and the processor is further configured:

to identify, after passing the later one of the first-direction packets to the second device and before passing the earlier ones of the first-direction packets to the second device, that a particular one of the second-direction packets likely indicates that the earlier ones of the first-direction packets were not yet received by the second device, and to calculate the estimated in-flight number, in response to the identifying, based on a volume of payload data contained in those of the first-direction packets passed to the second device by the processor subsequently to passing the later one of the first-direction packets to the second device.

In some embodiments, the processor is configured to identify that the particular one of the second-direction packets likely indicates that the earlier ones of the first-direction packets were not yet received by the second device responsively to a size of the particular one of the second-direction packets.

In some embodiments, the earlier ones of the first-direction packets include one or more ranges, each range including at least one of the first-direction packets, most of the second-direction packets share a standard size, and the processor is configured to identify that the particular one of the second-direction packets likely indicates that the earlier ones of the first-direction packets were not yet received by the second device responsively to the size of the particular one of the second-direction packets exceeding the standard size by a product of (i) a number of the ranges, and (ii) a known factor.

In some embodiments, the processor is further configured:

to identify a decline in a rate of the flow over a particular interval of time, and to set the estimated in-flight number to zero, in response to identifying the decline.

There is further provided, in accordance with some embodiments of the present invention, a method for regulating a flow of communication between a first device and a second device. The method includes receiving by a flow-regulating system, from the first device, a plurality of first-direction packets belonging to the flow, and passing the first-direction packets to the second device. The method further includes receiving by the flow-regulating system, from the second device, a plurality of second-direction packets belonging to the flow, and passing the second-direction packets to the first device. The method further includes calculating, after receiving each second-direction packet of at least some of the second-direction packets, an estimated in-flight number, by assuming that the second-direction packet acknowledges receipt of a number of the first-direction packets that is based on an estimated average number of received first-direction packets acknowledged by the second-direction packets, the estimated in-flight number being an estimated volume of payload data, contained at least partly in the first-direction packets, that has been passed by the flow-regulating system to the second device but has not yet been received by the second device. The method further includes, based on the estimated in-flight number, regulating the flow.

The present invention will be more fully understood from the following detailed description of embodiments thereof, taken together with the drawings, in which:

DETAILED DESCRIPTION OF EMBODIMENTS

Introduction

Figure 1:
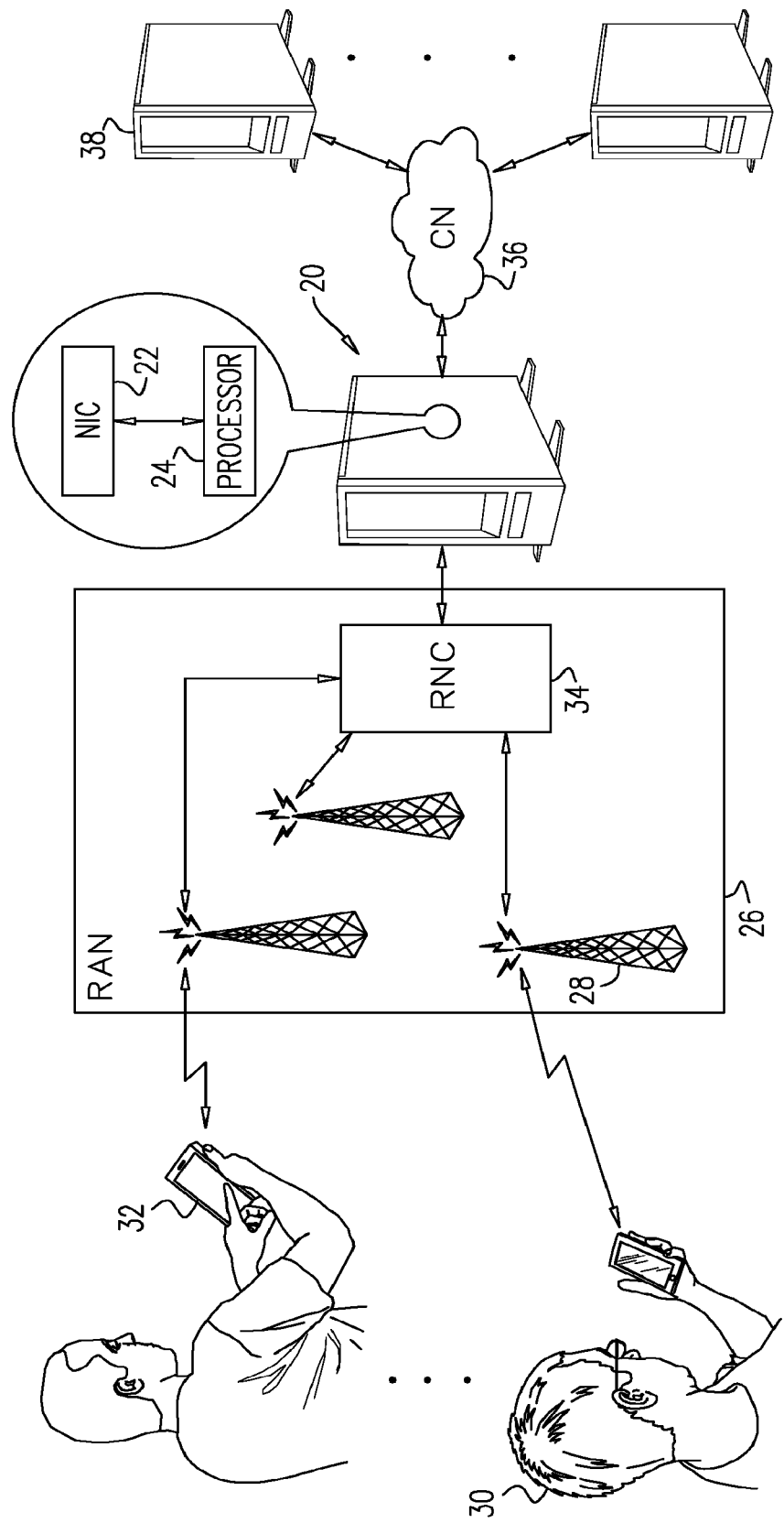
FIG. 1 is a schematic illustration of a flow-regulating system, in accordance with some embodiments of the present invention.

In embodiments of the present invention, packets exchanged between devices connected to a network pass through a flow-regulating system, such that the system receives the packets en-route to the packets' intended destinations. The system may therefore monitor the flows of communication over the network, and, based on this monitoring, regulate the flows. For example, the system may control the rate at which content is delivered from a server to a client (e.g., by informing the server to decrease the rate of content delivery, and/or by delaying the content en-route to the client), allocate bandwidth in a more effective manner, and/or perform any other traffic-shaping task.

To monitor and regulate a given flow of data from a first device to a second device, it is typically necessary to track the sequence and acknowledgement numbers, so that the "in-flight number," which is the quantity of data currently en-route to the second device, may be estimated. However, as described above in the Background, in QUIC packets, the seq and ack numbers are encrypted. Moreover, the frequency with which received data packets are acknowledged may vary; for example, in some cases, the receiving device may send an acknowledgement packet after a single data packet is received, while in other cases, the receiving device may refrain from sending an acknowledgement packet until two, three, four, or more data packets have been received. As a result, it may be challenging to track the progression of a QUIC flow. This challenge may similarly present itself with any other communication protocol in which the seq and ack numbers—or any other analogous fields that track the progression of a flow—are encrypted.

To address this challenge, embodiments of the present invention provide techniques for tracking flows having encrypted seq and ack numbers (or analogous encrypted fields), even without decrypting the seq and ack numbers. These techniques are typically (but not necessarily) performed in combination with each other.

A typical application for the techniques described herein is the tracking of the flow of content from one or more servers to a client. Hence, for simplicity, the description below relates mainly to such an application. Packets that are passed from the servers to the client (via the system) are referred to as "downstream packets," while packets passed from the client to the servers (via the system) are referred to as "upstream packets." In such applications, the system continually calculates an estimated in-flight number, which is the estimated volume of payload data, contained in the downstream packets, that has been passed by the system to the client but has not yet been received by the client.

Notwithstanding the above, it is noted that the system, using the techniques described herein, may track and regulate the flow of communication between any two devices connected to a network. For example, for a peer-to-peer communication session between two devices, the system may track two flows. First, the system may track a flow of data packets from the first device to the second device, in which the first device is analogous to a server, the second device is analogous to a client, packets passed from the first device to the second device (or "first-direction packets") are analogous to downstream packets, and packets passed from the second device to the first device (or "second-direction packets") are analogous to upstream packets. Second, the system may track a flow of data packets from the second device to the first device, in which the second device is analogous to a server, the first device is analogous to a client, packets passed from the second device to the first device (or "first-direction packets") are analogous to downstream packets, and packets passed from the first device to the second device (or "second-direction packets") are analogous to upstream packets. In such a case, the system may further calculate a separate estimated in-flight number for each of the two devices. (For example, the estimated in-flight number for the first device is the estimated in-flight volume of payload data, contained at least partly in the packets received by the system from the second device and passed to the first device, that has not yet been received by the first device.) Based on these estimated in-flight numbers, the system may regulate the flow of data to both the first and second device.

As noted above, the techniques described herein may be used to track any flow having encrypted seq and ack numbers (or analogous fields), regardless of the protocol used by the flow. Nonetheless, since the techniques described herein are commonly applied to flows that are UDP-based, such as QUIC flows, the description below generally refers to the flow that is tracked using the techniques described herein as a "UDP-based flow," and to the packets in this flow as "UDP-based packets."

Overview of Tracking Techniques

A first technique assumes that each upstream UDP-based packet acknowledges the receipt of a particular number "f" of downstream packets, where f is a pre-ascertained average number of received downstream packets acknowledged per acknowledgement packet. In QUIC, for example, the inventors have observed that each acknowledgement packet typically acknowledges the receipt of between one and four packets, with the average number of acknowledged received packets being 2.1. Thus, for example, given f=2.1, the system may assume that nine out of every 10 upstream UDP-based packets acknowledges the receipt of two downstream packets, and the remaining one of these upstream packets acknowledges the receipt of three downstream packets. Thus, for example, after 20 upstream UDP-based packets have been received by the system, the system may assume that the client has received at least 42 downstream packets.

Typically, the system regularly updates the value of f. To perform this update, the system counts the number $M_D$ of downstream UDP-based packets sent to the client, and the number $M_U$ of upstream UDP-based packets (which are assumed to be acknowledgement packets) received from the client, over a particular period of time (e.g., having a duration of one second). The system then computes the ratio $M_D/M_U$, and then computes a new f value from this ratio, e.g., by computing a weighted average of this ratio with the previous value of f.

In some cases, the first technique may yield an estimated number of received packets that deviates from the true number of received packets by a margin that continually increases with the passage of time. Hence, a second technique may complement the first technique, by correcting for these deviations. This technique uses information gleaned from a Transmission Control Protocol (TCP) flow occurring in parallel to the UDP-based flow. In TCP flows, seq and ack numbers are indicated in an unencrypted packet header. Hence, upon receiving an upstream TCP packet, the system may read the ack number from this packet, and then assume that the client has received whichever downstream UDP-based packet was passed to the client by the system at approximately the same time as was the downstream TCP packet indicated by this ack number.

For example, prior to a particular time interval, 50 downstream UDP-based packets, and 20 upstream UDP-based packets, may be received by the system. Subsequently, during the particular time interval, a 51st downstream UDP-based packet, along with a downstream TCP packet having a seq number of N0, may be received by the system. Subsequently to the time interval, another 5 downstream UDP-based packets, and another 2 upstream UDP-based packets, may be received by the system. Next, the system may receive an upstream TCP packet acknowledging receipt by the client of the downstream TCP packet, by including an ack number of N0. Based on this upstream TCP packet, the system may assume that the client has also received the 51st downstream UDP-based packet. Hence, the system may assume that at least the first 51 downstream packets of the UDP-based flow were received by the client. On the other hand, the first technique alone would provide a less-precise estimate of 46 or more received downstream packets (assuming f=2.1), based on the 22 upstream UDP-based packets received by the system. Conversely, in other situations, the first technique alone might provide a minimum number of received packets that is too high.

Alternatively or additionally to performing the second technique, the system may perform a third technique, which periodically or intermittently corrects for deviations in the estimated number of received packets. Per this technique, the system withholds from the client, at various intervals, several ranges of one or more packets each. This withholding causes the client to send the server a "selective acknowledgement" (or "SACK") message, which, in addition to acknowledging the receipt of one or more packets, specifies the ranges of packets that the client is missing. Typically, normal acknowledge messages have a standard size, with the size of a SACK message being greater than this standard size, in accordance with the number of specified missing ranges. (For example, in QUIC, normal acknowledge messages may have a standard size of 129 bytes, while a SACK message may specify each missing range using four additional bytes.) Hence, the system may identify any SACK messages from the client, by examining the sizes of the upstream messages. Upon identifying a particular SACK message, the system may correlate this message, based on the size of the message, to particular ranges of packets that were previously withheld from the client. The system may therefore infer that this message acknowledges receipt of the downstream packet that was sent to the client immediately after these ranges of packets were withheld.

For example, in a particular flow, the system may withhold the 100th packet, the 104th packet, and the 108th packet from the client. The system may subsequently receive a SACK message having a size of 141 bytes. Assuming a standard acknowledgement packet size of 129 bytes and an additional four bytes per missing range, the system may infer that this SACK message reports these withheld packets, since it is relatively unlikely that the client happened to be missing a different three ranges of packets. Hence, the system may further infer that this SACK message acknowledges receipt of at least the 109th packet of the flow, such that at least the first 109 packets of the flow (excluding the withheld packets) were received by the client. On the other hand, using only the first technique, the system might estimate, depending on the number of received upstream messages, a minimum number of received packets that is much higher or lower than 109.

Alternatively or additionally to performing one or more of the techniques described above, the system may assume, upon observing a decline in the communication bit rate of the flow over a particular period of time (e.g., four seconds), that all of the transmitted downstream packets have been received by the client. This technique helps the estimated number of received packets from falling too far behind the actual number of received packets.

System Description

Reference is initially made to FIG. 1, which is a schematic illustration of a flow-regulating system 20, in accordance with some embodiments of the present invention.

FIG. 1 depicts a plurality of users 30 exchanging communication over a Universal Mobile Telecommunications Service (UMTS) network, which includes a Radio Access Network (RAN) 26 and a Core Network (CN) 36. RAN 26 includes one or more base stations 28, which may also be referred to "Node Bs," and a radio network controller (RNC) 34, which acts as a gateway for communication traffic passing between CN 36 and base stations 28. Users 30 use respective devices 32, which may also be referred to as "User Equipment (UE)," to download and consume content provided by one or more content-delivery servers 38, and/or to exchange data with each other. Each device 32 is serviced by the base station serving the cell in which the client is located. Since, as noted above, the present description relates mainly to flows of data from a server to a client, devices 32 are referred to hereinbelow as "clients."

Typically, system 20 resides between RAN 26 and CN 36, such that all communication packets exchanged between the RAN and the CN pass through the system. The system may therefore control the rate at which downstream packets belonging to any given flow are passed to the RAN by delaying such packets en-route to the RAN, and/or perform any other flow-regulating or traffic shaping functions in response to the estimated in-flight numbers. For example, in response to the estimated in-flight number for a first UE being relatively high, the system may reduce the rate at which packets destined for a second UE are passed to the RAN (e.g., by delaying these packets), such that the RAN may commit more resources to servicing the first UE. In other words, the system may regulate (and in particular, increase the rate of) the flow of data to the first UE, by allocating more bandwidth to the first UE. Conversely, in response to an estimated in-flight number for a particular UE being relatively low, the system may reduce the rate at which packets are passed to the first UE, such that more bandwidth is allocated to another UE.

In other embodiments, system 20 resides outside of the cellular network, and passively monitors communication over the network, by receiving copies of each communicated data packet from a network tap situated between the RAN and the CN. In such embodiments, system 20 might not be able to practice one or more of the techniques described herein, and may need to instruct another system to regulate the flows of communication responsively to the estimated in-flight numbers calculated by system 20.

(It is noted that each communication packet belonging to a peer-to-peer communication session is passed between the RAN and the CN twice. For example, a packet sent from a first device to a second device passes (i) from the first device to the RAN, (ii) from the RAN to the CN, (iii) from the CN back to the RAN, and (iv) from the RAN to the second device. Typically, such packets are processed by system 20 on their second pass through the system, from the CN to the RAN.)

Notwithstanding the particular type of cellular network shown, it is noted that system 20 may be used to regulate the flow of communication (including voice communication, text, or any other suitable type of communication) over any type of cellular network, such as, for example, an LTE network, or any other suitable type of network that is not a cellular network, such as a cable or digital subscriber line (DSL) network.

System 20 comprises a network interface, such as a network interface controller (NIC) 22, and a processor 24. Each communication packet (or a copy thereof, in passive-monitoring embodiments) is received by processor 24 via NIC 22. Processor 24 may be embodied as a single processor, or as a cooperatively networked or clustered set of processors. For example, processor 24 may be embodied as a cooperatively networked pair of processors, one of which performs the flow-monitoring techniques described herein, and the other of which regulates the flow of communication over the network responsively to the monitoring.

In some embodiments, the functionality of processor 24, as described herein, is implemented solely in hardware, e.g., using one or more field-programmable gate arrays (FPGAs). In other embodiments, this functionality is at least partly implemented in software. For example, processor 24 may be a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the processor in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein. In some embodiments, processor 24 is implemented on a virtualized platform, e.g., using network functions virtualization (NFV).

From the "control plane" signaling packets passed over the network, the processor ascertains the respective locations of clients 32. For example, the processor may ascertain, based on a particular signaling packet, that a particular client has entered a new cell. The processor associates this information with the "data plane" (or "user plane") packets, such as to monitor and regulate the downloading of content as described herein. For example, further to ascertaining, from a particular signaling packet, that a particular client has entered a new cell, the processor may identify that a particular downstream data-plane packet is destined for the client, based on a common ID (such as a tunnel ID) and/or IP address appearing in both the signaling packet and the downstream data-plane packet.

Further to receiving an upstream or downstream data-plane packet, the processor may record information from the packet, as further described below with reference to FIGS. 2A-B. (For example, the processor may record the number of bytes contained in the payload of a downstream data-plane packet.) The processor may further ascertain the type of content that the packet contains, and delay or modify the packet responsively thereto. For example, in response to ascertaining the type of content contained in a particular downstream packet, the processor may delay the packet before passing the packet to the RAN, in order to facilitate achieving a desired download rate. In general, the processor may use any suitable technique for identifying the type of content that a particular data-plane packet contains, such as any of the techniques described in U.S. Pat. No. 9,521,060, whose disclosure is incorporated herein by reference. For example, in the event that a particular data-plane packet is encrypted, the processor may deduce the type of content that the data-plane packet contains, based on Domain Name System (DNS) messages received prior to receiving the packet.

(In general, the remainder of the present description does not relate to control-plane packets, such that it may be assumed that any "packet" referred to below is a data-plane packet. Data-plane packets include both data packets—which, as described above, carry payload data—and other types of packets, such as acknowledgement packets.)

Calculating Estimated In-Flight Numbers

Introduction

Figure 2A:
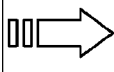
FIGS. 2A-B collectively illustrate various techniques for monitoring one or more flows of communication exchanged with a client, in accordance with some embodiments of the present invention.
Figure 2B:
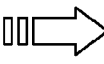

Reference is now made to FIGS. 2A-B, which collectively illustrate various techniques for monitoring one or more flows of communication exchanged with any particular client 32 (FIG. 1), in accordance with some embodiments of the present invention. In particular, FIGS. 2A-B show a table illustrating the progression of two example parallel flows of communication, and the actions taken by processor 24 responsively to the progression of these flows. (FIG. 2B continues from FIG. 2A.)

Typically, the processor assigns a different respective identifier to each ongoing flow—UDP-based or otherwise—in which data is being passed to the client. The processor further maintains, for each client, a record of the client's ongoing flows. (Typically, a separate instance of this record is maintained, per client, for each base station in the network.) This record is typically embodied as a cyclic "UE Condition" array 40, which is shown in the second-last column of the table. Array 40 includes a plurality of buckets; for example, in FIGS. 2A-B, array 40 includes ten buckets B1 ... B10. (In practice, the number of buckets in array 40 is usually much larger than ten.) The buckets correspond to respective time intervals, which are typically of equal duration. This duration may have any suitable value, such as, for example, 4 ms. Upon receiving a downstream packet, sent by a server to the client, and passing this packet on to the client, the processor records the "size" of the packet—i.e., the number of bytes contained in the payload of the packet—in the bucket that corresponds to the interval of time during which the packet was passed to the client.

By way of example, the first column of the table shows twelve successive time intervals TI0 ... TI11, during each of which (with the exception of TI0), processor 24 receives a packet belonging to one of the flows, as indicated in the third column of the table. (Although, in general, processor 24 may receive any number of packets during any given time interval, FIGS. 2A-B assume, for simplicity, that no more than one packet is received per time interval.) A first, "current bucket" pointer points to the current bucket, i.e., the bucket corresponding to the current time interval, as indicated in the second column of the table. Upon receiving a downstream packet and immediately passing the packet on to the client, as indicated in the fourth column of the table, the processor increments the number stored in the current bucket by the size of the packet. The current bucket may thus be said to "correspond to" the packet, in that the current bucket records the size of the packet.

At the end of any given time interval, the first pointer is moved to the next bucket in the array, and the next bucket is then reset, i.e., the number of bytes in the bucket is set to zero. After reaching the end of array 40, the first pointer moves back to the first bucket in the array; the first pointer may thus cycle through array 40 any number of times.

Typically, the processor further maintains a cache, which stores the correspondence between the buckets and the downstream packets. For each downstream packet recorded in array 40, the processor records, in the cache, a mapping from (i) the seq number, or assumed seq number, of the packet, to (ii) an identifier of the bucket in which the packet was recorded. For example, the processor may compute a key for the packet by hashing the seq number of the packet with the identifier of the flow to which the packet belongs. The processor may then store, in a hash table, a mapping from this key to the index of the bucket. This "Write" operation on the cache is indicated in the seventh column of the table. As further described below, upon receiving an upstream packet, the processor may read from the cache, this "Read" operation being likewise indicated in the seventh column of the table.

While the flows progress, a second, "ack" pointer points to the bucket that corresponds to the latest packet that is known, or is assumed, to have been received by the client, as indicated in the eighth column of the table. Upon receiving an acknowledgement packet, or an upstream packet that is assumed to be an acknowledgement packet, from the client, the processor updates the second pointer, as described in detail below.

Based on the first and second pointers, the processor may, at any given instant, calculate an estimated in-flight number, which is the estimated volume of payload data that has been passed by the processor to the client but has not yet been received by the client. This number, referred to herein by the notation "$IF_{EST}$," is shown in the last column of the table.

(Although the present description generally expresses volumes of data in units of bytes, it is noted that the system described herein may use any other suitable units, alternatively or additionally to using bytes. For example, instead of storing the numbers of bytes contained in the respective payloads of the downstream packets and calculating $IF_{EST}$ in units of bytes, the system may store the numbers of bits or kilobytes contained in the payloads, and/or calculate $IF_{EST}$ in units of bits or kilobytes.)

For example, if the first pointer points to bucket B5, and the second bucket points to bucket B3, the estimated in-flight number may be calculated as the sum of the number stored in bucket B4 and the number stored in bucket B5. Typically, the processor decreases $IF_{EST}$ after each upstream packet is received, and increases $IF_{EST}$ after each downstream packet is passed to the client.

Typically, processor 24 runs two separate modules in parallel: a first module, which calculates $IF_{EST}$ for each client, and a second module, which, based on the $IF_{EST}$ calculations, regulates one or more flows with one or more clients, e.g., by controlling the rate at which downstream packets are passed to the RAN. These modules may be collectively run on a single processor, or on a cooperatively networked group of processors, as described above. (Any packets delayed by the second module are delayed prior to these packets reaching the first module, so that the $IF_{EST}$ calculation does not take these packets into account.)

Typically, to track a UDP-based flow, processor 24 maintains two counters, as shown, respectively, in the fifth and sixth columns of the table. The first of these counters is "sim_seq," which tracks the number of downstream packets belonging to the flow that have been forwarded by the processor to the client. Sim_seq is initialized to zero. Subsequently, for each downstream packet forwarded to the client, the processor increments sim_seq by one, such that the forwarded packet has an "assumed sequence number" equal to the new value of sim_seq. (Alternatively, sim_seq may be initialized to one, and each downstream packet may have an assumed sequence number equal to the value of sim_seq before the incrementing of sim_seq.) After passing a given UDP-based packet to the client, the processor stores the assumed sequence number of the packet in the same UE-condition bucket in which the processor stores the size of the packet.

The second of these counters is "sim_ack," which tracks the estimated number of downstream packets belonging to the flow that have been acknowledged by the client. As described in detail below, for each upstream packet received by the processor, the processor increments sim_ack by an appropriate increment, and then assumes that the client has received all downstream packets up to and including the downstream packet having an assumed sequence number equal to the new value of sim_ack.

It is noted that the maintenance of the sim_seq and sim_ack counters as described herein does not require that the actual seq and ack numbers in the UDP-based packets are packet serial numbers (as is the case, for example, in the QUIC protocol). Rather, even if the actual seq and ack numbers are byte-number offsets (as is the case, for example, in the TCP protocol), the flow may be effectively monitored by maintaining the sim_seq and sim_ack counters as described herein.

FIG. 2A first shows an initial state of the relevant variables maintained by processor 24, during the first time interval TI0, prior to the start of any communication flows. During TI0, sim_seq and sim_ack each have a value of zero, and the first and second pointers point to the same bucket B8. By virtue of the coincidence of the two pointers, $IF_{EST}$ is zero, i.e., it is assumed that no packets are in-flight.

Next, during time interval TI1, corresponding to bucket B1, the processor receives a downstream UDP-based packet P1, having a size N1, i.e., a payload that includes N1 bytes. Before or after forwarding this packet to the client, the processor increments sim_seq by one, such that packet P1 is assigned an assumed sequence number of one. The processor also stores size N1 in bucket B1, along with the assumed sequence number of packet P1. The processor further writes, to the cache, a mapping "1→B1," which maps from the assumed sequence number of the packet to an identifier of bucket B1. (As described above, the "key" in this mapping may be a hash of the assumed sequence number with an identifier of the UDP-based flow, while the "value" in this mapping may be the index of bucket B1 in array 40.) Following the forwarding of packet P1 to the client, $IF_{EST}$=N1.

Subsequently, during the next time interval TI2, the processor receives a downstream TCP packet P2 having an unencrypted seq number S1, and a size N2. Before or after forwarding this packet to the client, the processor stores size N2 in the current bucket B2, and further stores the appropriate mapping ("S1→B2") in the cache. Since packet P2 does not belong to the UDP-based flow, the processor does not update sim_seq. Following the forwarding of packet P2 to the client, $IF_{EST}$=N1+N2.

In some embodiments, as assumed in FIGS. 2A-B, the processor stores in each bucket, for each UDP-based flow, the highest assumed sequence number that has been attained thus far in the flow. Thus, if no UDP-based packets are received during a particular time interval, the processor copies the highest assumed sequence number from the previous bucket into the current bucket, which corresponds to the particular time interval. For example, FIG. 2A shows that at the end of time interval TI2, the processor copies the "1" from bucket B1 into bucket B2. In other embodiments, the processor stores the respective assumed sequence numbers of any packets received during the time interval (or at least the highest of these assumed sequence numbers), but does not copy any assumed sequence numbers from previous buckets. In such embodiments, given the scenario in FIG. 2A, no sim_seq value would be stored in bucket B2.

Subsequently, during the next time interval TI3, the processor receives another downstream UDP-based packet P3 having a size N3. In response to receiving this packet, the processor updates sim_seq, array 40, and the cache, as described above for packet P1. At this point, the estimated in-flight number is N1+N2+N3 bytes.

Estimating the Number of Acknowledged Packets Based on an Average Number of Acknowledged Packets During the next time interval 114, the processor receives an upstream UDP-based packet P4. Packet P4 includes an acknowledgement number that indicates the number of downstream UDP-based packets that were received by the client at the time at which packet P4 was communicated by the client. Given, however, that this acknowledgement number is encrypted, the processor does not know, by simply reading packet P4, (i) whether packet P4 is an acknowledgement packet, and (ii) if packet P4 is indeed an acknowledgement packet, whether packet P4 acknowledges the receipt of both packets P1 and P3, or only of packet P1.

Typically, while a client downloads content over a given flow of communication, a large majority of packets communicated by the client over the flow are acknowledgement packets. Hence, to address the first challenge without decrypting packet P4, the processor may assume that packet P4, along with any other packet received from the client, is an acknowledgement packet. Alternatively, the processor may compare the size of packet P4 to a suitable threshold. If the size of packet P4 is less than the threshold, the processor may assume that packet P4 is an acknowledgement packet. Otherwise, the processor may assume that packet P4 is a data packet belonging to another, parallel flow carrying data from the client, and may therefore ignore the packet, or process the packet separately, in the context of a different flow. (This comparison is particularly practiced when monitoring a peer-to-peer communication session, in which "upstream" acknowledgement packets belonging to one flow must be differentiated from "downstream" data packets belonging to the corresponding parallel flow.)

Following the identification of packet P4 as an acknowledgement packet, the processor may address the second challenge (without decrypting the acknowledgement number in packet P4) by assuming that packet P4 acknowledges receipt of a number of downstream packets that is based on f, the estimated average number of received downstream packets acknowledged by upstream packets belonging to the UDP-based flow.

For example, if the processor estimates that, on average, an upstream packet belonging to the UDP-based flow acknowledges 2.1 downstream packets (i.e., f=2.1), the processor may assume that packet P4 acknowledges two downstream packets—namely, packets P1 and P3. (Since, typically, each acknowledgement packet acknowledges a whole number of packets, the processor typically rounds the estimated average down or up to the nearest whole number, to calculate the estimated number of packets acknowledged by a given upstream packet.) The processor may therefore increase sim_ack by 2, such that the new value of sim_ack is 2. Subsequently, the processor may look up this sim_ack value in the cache, and then update the second pointer to point to the bucket—namely, bucket B3—that is associated in the cache with this sim_ack value. Subsequently, the processor may calculate an estimated in-flight number of zero, which indicates that all of the downstream packets (including packets P1, P2, and P3) passed to the client by the system are assumed to have been received by the client.

In general, the processor does not allow sim_ack to exceed sim_seq. Thus, for example, if packet P4 were to have been received before packet P3, the processor would have increased sim_ack only to 1, rather than to 2, despite f being greater than 2. In general, the processor may assume that a given upstream UDP-based packet acknowledges min(K1, K2) downstream UDP-based packets, where K1 is derived from f (such that, for example, K1=2 or 3 for f=2.1), and K2=sim_seq−sim_ack. Thus, in response to receiving this upstream packet, the processor may increase sim_ack by min(K1, K2).

It is noted that the processor may assume, as described above, that packet P4 acknowledges the receipt of packet P3, even though an acknowledgement for TCP packet P2 was not yet received. Alternatively, given that an acknowledgement for TCP packet P2 was not yet received, the processor may assume that packet P4 acknowledges only packet P1. In general, for such alternate embodiments, the processor may assume that a given upstream UDP-based packet acknowledges min(K1, K3) downstream UDP-based packets, where K1 is as described above, and K3 is the number of downstream UDP-based packets received by the processor prior to the earliest-received TCP packet for which an acknowledgement was not yet received. Thus, in response to receiving this upstream packet, the processor may increase sim_ack by min(K1, K3).

Typically, early in a UDP-based flow, the client tends to acknowledge a smaller number of received downstream packets with each acknowledgement packet, relative to later in the flow. Hence, in some embodiments, the processor assumes a lower number of acknowledged downstream packets for upstream packets that are received earlier in the flow, relative to upstream packets received later in the flow. For example, given that packet P4 is the first upstream packet belonging to the UDP-based flow, the processor may assume that this packet acknowledges the receipt of only one downstream packet (namely, packet P1), despite f being greater than 2.

In some embodiments, the initial value of f is provided to the processor, prior to the processor beginning to receive the downstream packets belonging to the monitored UDP-based flow. In other embodiments, the processor calculates the initial value of f. For example, the processor may identify the total number $N_D$ of downstream packets, and the total number $N_U$ of upstream packets, belonging to one or more other flows. The processor may then calculate f by calculating a ratio between $N_D$ and $N_U$; for example, f may be equal to $N_D/N_U$. Each of the other flows used for counting $N_D$ and $N_U$ may use any protocol that is similar to the protocol used by the monitored UDP-based flow, with respect to the frequency of acknowledgement packets. For example, QUIC may follow the same guidelines for sending acknowledgement packets as does CUBIC TCP, which is a particular implementation of TCP. Hence, to calculate f for QUIC flows, the processor may count $N_D$ and $N_U$ over a number of flows that include both QUIC flows and CUBIC TCP flows.

As the monitored UDP-based flow progresses, the processor may repeatedly update f, based on the ratio between (i) the number $M_D$ of downstream packets belonging to the monitored UDP-based flow that have been received by the flow-regulating system and passed to the client during a particular period of time, and (ii) the number $M_U$ of upstream packets belonging to the monitored UDP-based flow that have been received by the flow-regulating system during the period of time. For example, the processor may calculate a weighted average of the previous value of f with the ratio $M_D/M_U$, by applying the equation $f=\alpha*f_{previous}+(1-\alpha)*M_D/M_U$, where $f_{previous}$ is the previous value of f, and $\alpha$ is any number between 0 and 1. (Typically, $\alpha$ is close to 1, such that sudden, large changes in f are generally avoided.) For example, if, four seconds into the monitored flow, 100 downstream UDP-based packets have been passed to the client and 50 upstream UDP-based packets have been received from the client, the processor may update f based on the ratio 100/50=2. (For example, if the previous value of f was 2.1, the processor may calculate the new value of f as $\alpha*2.1+(1-\alpha)*2$.) If, during the next four seconds, another 100 downstream packets are passed to the client, and another 52 upstream packets are received, the processor may again update f, based on the ratio 100/52=1.92.

Adjustments Based on a Parallel Flow

If the processor were to base the sim_ack value only on f, the sim_ack value might grow significantly larger than the actual number of acknowledged downstream packets in some cases, such that the processor's estimated in-flight number might be significantly smaller than the true number of unreceived downstream packets. In other cases, the sim_ack value might not grow quickly enough, such that the processor's estimated in-flight number might be significantly larger than the true number of unreceived downstream packets. For example, with f=2.1, the processor might assume, after 1000 upstream UDP-based packets have been received, that 2100 downstream UDP-based packets were received by the client, whereas the actual number of received downstream UDP-based packets might be significantly lower or higher than 2100.

Hence, in some embodiments, the processor adjusts sim_ack, and hence the estimated in-flight number $IF_{EST}$, based on another flow, such as a TCP flow, occurring in parallel to the UDP-based flow and carrying data to the client from the server or from any other device, in which sequence and acknowledgement numbers are unencrypted. This adjustment is based on the working assumption that an acknowledgement of the receipt of a particular packet that was passed by the system to the client during a particular time interval indicates that (i) all packets passed to the client prior to or during the particular time interval were also received by the client, and (ii) packets passed to the client after the particular time interval were not yet received by the client at the time that the acknowledgement was sent.

For example, FIG. 2A illustrates the processor receiving, during time interval 115, an upstream TCP packet P5 having an (unencrypted) acknowledgement number of S1, indicating that TCP packet P2, which has a sequence number of S1, was received by the client. The processor therefore assumes that all of the downstream UDP-based packets that were passed to the client before or during time interval TI2, which is the time interval during which packet P2 was passed to the client, were received by the client, whereas the downstream UDP-based packets passed to the client subsequently to time interval TI2 were not yet received by the client. The processor may therefore calculate $IF_{EST}$ based on the combined size of (i.e., the volume of payload data contained in) the downstream UDP-based packets that were passed to the client subsequently to time interval TI2. In the case shown in FIG. 2A, this quantity is N3, the size of packet P3. Hence, since no additional downstream packets belonging to any other flows were passed to the client subsequently to time interval TI2, the calculated $IF_{EST}$ is N3. (If additional downstream packets were to have been passed to the client subsequently to time interval TI2, the processor would calculate $IF_{EST}$ by adding the combined size of these packets to N3.)

In practice, the processor does not need to explicitly make reference to time interval TI2; rather, the processor may, as usual, calculate the estimated in-flight number from array 40. First, the processor reads, from the cache, the identity of the bucket corresponding to S1—namely, bucket B2. Next, the processor updates the second pointer, which tracks the latest acknowledged packet, to point to bucket B2. Since bucket B2 contains the assumed sequence number of 1, the processor sets sim_ack to 1.

Following the adjustment of the second pointer, a total quantity of N3 is contained in array 40 between the second pointer and the first pointer, which points to bucket B5. Hence, the processor calculates an estimated in-flight number of N3.

As described above, FIGS. 2A-B assume that each bucket in array 40 contains, for each UDP-based flow, at least the highest sim_seq value that has been assigned, thus far, to any packet in the flow. (Hence, bucket B2 contains a sim_seq value of 1, such that, upon receiving packet P5 and accordingly setting the second pointer to point to bucket B2, the processor decreases sim_ack to 1.) In other embodiments, as described above, each bucket stores only the sim_seq values that have been assigned, or at least the greatest sim_seq value that has been assigned, during the time interval to which the bucket corresponds. In such embodiments, the processor sets the second pointer to the bucket indicated by a received TCP acknowledgement packet, and accordingly adjusts sim_ack and $IF_{EST}$, only if the indicated bucket contains a sim_seq value. Stated differently, the processor adjusts the second pointer, sim_ack, and $IF_{EST}$ in accordance with a received TCP acknowledgement packet, only if the TCP acknowledgement packet acknowledges the receipt of a packet that was sent by the processor to the client during the same time interval as a UDP-based packet was sent by the processor to the client.

(It is noted that, in the particular case shown in FIG. 2A, the processor would know to set sim_ack to 1, even if bucket B2 would not store this value. However, in more complex cases, the processor would not know the proper value to assign to sim_ack, if this value were not stored in the bucket indicated by the TCP acknowledgement packet.)

Adjustments Based on Sack Messages

Alternatively or additionally to adjusting sim_ack and $IF_{EST}$ based on a parallel flow, the processor may adjust sim_ack and $IF_{EST}$ based on received SACK messages.

To perform this technique, the processor temporarily withholds one or more earlier downstream UDP-based packets from the client, while passing a later UDP-based downstream packet to the client; in other words, the processor passes the later packet to the client before passing the earlier packets. After passing the later downstream packet to the client, and before passing the earlier downstream packets to the client, the processor identifies that a particular upstream UDP-based packet is likely a SACK packet, in that this packet likely indicates that the earlier downstream packets were not yet received by the client. In response to identifying the SACK packet, the processor assumes that the SACK packet additionally indicates that the later downstream packet was received by the client. The processor therefore calculates $IF_{EST}$ based on the volume of payload data contained in those downstream packets that were passed to the client subsequently to passing the later downstream packet to the client.

By way of illustration, FIGS. 2A-B show several additional downstream UDP-based packets received subsequently to time interval TI5. In particular, during the respective time intervals TI6, TI7, TI8, TI9, and TI10, the processor receives downstream UDP-based packets P6, P7, P8, P9, and P10. However, the processor does not immediately pass packets P6 and P8 to the client upon receiving these packets. Rather, the processor withholds these packets from the client and first passes the later packet P9 to the client, along with the subsequent packet P10. (Packet P7 is passed immediately to the client, before the receipt of packet P8.) Sim_seq is increased for each packet that is passed to the client, such that packets P7, P9, and P10 are assigned, respectively, assumed sequence numbers of 3, 4, and 5.

Subsequently, during the time interval TI11, the processor receives an upstream packet P11. The processor identifies, e.g., as further described below, that packet P11 is likely a SACK packet, indicating that the client is missing packets P6 and P8. In response to this identifying, the processor assumes that packet P11 also acknowledges the receipt of packet P9, but does not acknowledge the receipt of the subsequent downstream packet P10. (This is a reasonable assumption since, typically, the client reports any missing packets to the server immediately upon noticing that these packets are missing.) Consequently, the processor may calculate $IF_{EST}$ based on the volume of payload data contained in packet P10. In this case, since no additional downstream packets were communicated to the client after packet P10, $IF_{EST}$=N10.

As an example implementation of this $IF_{EST}$ calculation, when passing packet P9, which is the first packet to follow the last withheld packet, to the client, the processor may record the assumed sequence number of this packet, i.e., 6, in a suitable location in memory. Subsequently, upon identifying that packet P11 likely indicates that packets P6 and P8 are missing, the processor may retrieve the stored sequence number of 6, set sim_ack to 6, and then look up the identity of the bucket—namely, bucket B9—associated in the cache with sim_seq=6. The processor may then set the second pointer to point to B9, such that the quantity contained between the second and first pointers is N10. (It is noted that, for TI11, the first pointer has wrapped around to the beginning of array 40.)

The processor typically identifies that packet P11 is likely a SACK packet, indicating that the withheld packets are missing, responsively to the size of packet P11. For example, most of the upstream UDP-based packets may share a standard size N4 (which is the size of packet P4 in FIG. 2A), whereas the size of packet P11, N11, may exceed N4. In response to the larger size N11 of packet P11, the processor may identify that packet P11 is likely a SACK packet.

In some protocols, a SACK packet contains a fixed number L of additional bytes for every range of missing packets that the SACK packet reports, such that the difference in size between a SACK packet and a normal acknowledgement packet is the product of L and the number of ranges of reported missing packets. (In the context of the present application, including the claims, a "range" of packets is a group of one or more consecutive packets; thus, for example, by withholding packets P6 and P8, which are not consecutive, the processor withholds two ranges of packets.) For such protocols, given the known factor L, the processor may withhold K ranges of downstream packets, K typically being greater than one, and then identify the subsequent SACK packet in response to the size of this packet exceeding the standard upstream-packet size by K*L. Thus, for example, in the case shown in FIG. 2B, the processor may identify that packet P11 is likely a SACK packet responsively to the difference N11-N4 being equal to 2L.

Subsequently to updating sim_ack, the second pointer, array 40, and $IF_{EST}$, the processor passes the withheld packets to the client. In so doing, the processor updates sim_seq and array 40 as appropriate, as illustrated in FIG. 2B.

In general, the processor may withhold any number of ranges at any suitable frequency, with each range including any suitable number of packets, and with any suitable spacing between the withheld ranges. As a purely illustrative example, the processor may withhold, every three seconds, three ranges, each range including a single packet, with five non-withheld downstream packets between each pair of successive ranges.

Resetting Sim_Ack

In some embodiments, responsively to identifying an interruption in the UDP-based flow over a given interval of time, the processor may reset sim_ack to be equal to sim_seq, thus setting $IF_{EST}$ to zero. Alternatively or additionally, the processor may perform this resetting in response to identifying a decline in the rate of the flow over a given interval of time. For example, the processor may continually compute the derivative, with respect to time, of the number of received downstream packets. If this derivative remains less than a particular (negative) threshold for the given interval of time, the processor may reset sim_ack, and hence set $IF_{EST}$ to zero.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A non-transitory, computer readable medium having code stored therein for regulating a flow of communication between a first device and a second device, wherein when the code is executed by a flow-regulating system, the flow-regulating system performs operations comprising:
   receiving by the flow-regulating system, from the first device, a plurality of first-direction packets belonging to the flow, and passing the first-direction packets to the second device;
   receiving by the flow-regulating system, from the second device, a plurality of second-direction packets belonging to the flow, and passing the second-direction packets to the first device;
   calculating, after receiving each second-direction packet of a least some of the second-direction packets, an estimated in-flight number, by assuming that the second direction packet acknowledges receipt of a number of the first-direction packets that is based on an estimated average number of received first-direction packets acknowledged by the second-direction packets,
      the estimated in-flight number being an estimated volume of payload data, contained at least partly in the first-direction packets, that has been passed by the flow-regulating system to the second device but has not yet been received by the second device; and
   based on the estimated in-flight number, regulating the flow.

2. The non-transitory, computer readable medium having code stored therein according to claim 1, wherein each second-direction packet of the second-direction packets includes an encrypted acknowledgement number that indicates a number of the first-direction packets that were received by the second device at a time at which the second-direction packet was communicated by the second device, and wherein calculating the estimated in-flight number comprises calculating the estimated in-flight number without decrypting the acknowledgement number in any of the second-direction packets.

3. The non-transitory, computer readable medium having code stored therein according to claim 1, wherein regulating the flow comprises regulating the flow by controlling a rate at which the first-direction packets are passed to the second device.

4. The non-transitory, computer readable medium having code stored therein according to claim 1, wherein the flow uses a Quick User Datagram Protocol Internet Connections (QUIC) communication protocol.

5. The non-transitory, computer readable medium having code stored therein according to claim 1, wherein when execution of the code by the flow-regulating system causes the flow-regulating system to perform further operations comprising, prior to receiving the first-direction packets:
   identifying a total number of other first-direction packets, and a total number of other second-direction packets at least some of which acknowledge receipt of the other first-direction packets, belonging to one or more other flows; and calculating the estimated average number of received first-direction packets acknowledged by the second-direction packets, by calculating a ratio between the total number of other first-direction packets and the total number of other second-direction packets.

6. The non-transitory, computer readable medium having code stored therein according to claim 1, wherein execution of the code by the flow-regulating system causes the flow-regulating system to perform further operations comprising, as the flow progresses, repeatedly updating the estimated average number of received first-direction packets acknowledged by the second-direction packets, based on a ratio between (i) a number of the first-direction packets that have been received by the flow-regulating system and passed to the second device, and (ii) a number of the second-direction packets that have been received by the flow-regulating system.

7. The non-transitory, computer readable medium having code stored therein according to claim 1, wherein the flow is a first flow, wherein the first-direction packets are first-flow first-direction packets, and wherein execution of the code by the flow-regulating system causes the flow-regulating system to perform further operations comprising:

receiving, and passing to the second device during a particular interval of time, a second-flow first-direction packet belonging to a second flow of communication;

receiving, subsequently to the particular interval of time, a second-flow second-direction packet, belonging to the second flow, that indicates that the second-flow first-direction packet was received by the second device; and in response to receiving the second-flow second-direction packet, calculating the estimated in-flight number based on a volume of payload data contained in those of the first-flow first-direction packets that were passed to the second device by the flow-regulating system subsequently to the particular interval of time.

8. The non-transitory, computer readable medium having code stored therein according to claim 1, wherein receiving the first-direction packets comprises receiving one or more earlier ones of the first-direction packets, wherein passing first-direction packets to the second device comprises passing the later one of the first-direction packets to the second device before passing the earlier ones of the first-direction packets to the second device and wherein execution of the code by the flow-regulating system causes the flow-regulating system to perform further operations:

after passing the later one of the first-direction packets to the second device and before passing the earlier ones of the first direction packets to the second device, identifying that a particular one of the second-direction packets likely indicates that the earlier ones of the first-direction packets were not yet received by the second device, and in response to the identifying, calculating the estimated in-flight number based on a volume of payload data contained in those of the first direction packets passed to the second device by the flow-regulating system subsequently to passing the later one of the first-direction packets to the second device.

9. The non-transitory, computer readable medium having code stored therein according to claim 8, wherein identifying that the particular one of the second-direction packets likely indicates that the earlier ones of the first direction packets were not yet received by the second device comprises identifying that the particular one of the first-direction were not yet received by the second device responsively to a size of the particular one of the second-direction packets.

10. The non-transitory, computer readable medium having code stored therein according to claim 9, wherein the earlier ones of the first-direction packets include one or more ranges, each range including at least one of the first-direction packets, wherein most of the second-direction packets share a standard size, and wherein identifying that the particular one of the second-direction packets likely indicates that the earlier ones of the first-direction packets were not yet received by the second device comprises identifying that the particular one of second-direction packets likely indicates that the earlier ones of the first-direction packets were not yet received by the second device responsively to the size of the particular one of the second-direction packets exceeding the standard size by a product of (i) a number of the ranges, and (ii) a known factor.

11. The non-transitory, computer readable medium having code stored therein according to claim 1, execution of the code by the flow-regulating system causes the flow-regulating system to perform further operations comprising:

identifying a decline in a rate of the flow over a particular interval of time; and in response to identifying the decline, setting the estimated in-flight number to zero.

* * * * *